United States Patent
Badanov et al.

(10) Patent No.: US 12,330,598 B2
(45) Date of Patent: Jun. 17, 2025

(54) SYSTEM FOR AND METHOD OF CLEANING A SURFACE OF A SENSOR ON A SELF-DRIVING CAR

(71) Applicant: YANDEX SELF DRIVING GROUP LLC, Moscow (RU)

(72) Inventors: Sergey Aleksandrovich Badanov, Moscow (RU); Viktor Igorevich Zavadskii, Moscow (RU); Gleb Olegovich Mishugin, Moscow (RU); Mikhail Vladimirovich Khalizov, Moscow (RU)

(73) Assignee: Y.E. Hub Armenia LLC, Yerevan (AM)

( * ) Notice: Subject to any disclaimer, the term of this patent is extended or adjusted under 35 U.S.C. 154(b) by 384 days.

(21) Appl. No.: 17/580,843

(22) Filed: Jan. 21, 2022

(65) Prior Publication Data
US 2022/0306049 A1   Sep. 29, 2022

(30) Foreign Application Priority Data
Mar. 26, 2021   (RU) .......................... RU2021108154

(51) Int. Cl.
*B60S 1/56* (2006.01)
*B05B 7/08* (2006.01)
(Continued)

(52) U.S. Cl.
CPC .............. *B60S 1/56* (2013.01); *B05B 7/0815* (2013.01); *B60S 1/481* (2013.01); *B60S 1/54* (2013.01)

(58) Field of Classification Search
None
See application file for complete search history.

(56) References Cited

U.S. PATENT DOCUMENTS

| 6,199,773 B1 | 3/2001 | Holt et al. |
| 8,486,030 B2 | 7/2013 | Thomason et al. |

(Continued)

FOREIGN PATENT DOCUMENTS

| CN | 109927679 A | 6/2019 |
| CN | 210634528 U | 5/2020 |

(Continued)

OTHER PUBLICATIONS

Gustafsson C., Karlsson F. "Development of a Lidar Cleaning System for Autonomous Trucks"—Master's thesis in Product Development, Chalmers University of Technology, Sweden, Jun. 2019.

(Continued)

*Primary Examiner* — Rita P Adhlakha
(74) *Attorney, Agent, or Firm* — BCF LLP

(57) ABSTRACT

There is provided a delivery unit for a cleaning system and a method of operation. The delivery unit has a liquid nozzle for delivering a liquid jet and directing the liquid jet towards a surface of a sensor system, an air nozzle for delivering an air jet and directing the air jet towards the surface of the sensor system, and a deflection orifice for delivering an other air jet for deflecting the liquid jet away from the air nozzle. The liquid nozzle is located proximate to the air nozzle. The air nozzle and the deflection orifice are in fluid communication with a single air manifold.

10 Claims, 10 Drawing Sheets

(51) Int. Cl.
  *B60S 1/48* (2006.01)
  *B60S 1/54* (2006.01)

(56) References Cited

U.S. PATENT DOCUMENTS

| | | | |
|---|---|---|---|
| 9,505,382 | B2 | 11/2016 | Gokan |
| 10,232,828 | B2 | 3/2019 | Ekola et al. |
| 10,286,880 | B2 | 5/2019 | Schmidt et al. |
| 10,589,724 | B2 | 3/2020 | Krishnan et al. |
| 10,737,662 | B2 | 8/2020 | Deane et al. |
| 10,773,273 | B2 | 9/2020 | Mousavi Ehteshami et al. |
| 11,279,325 | B2 * | 3/2022 | Sykula ............... G02B 27/0006 |
| 2003/0155001 | A1 | 8/2003 | Hoetzer et al. |
| 2015/0343999 | A1 | 12/2015 | Lopez Galera et al. |
| 2018/0015907 | A1 | 1/2018 | Rice |
| 2019/0210570 | A1 | 7/2019 | Schmidt |
| 2020/0088857 | A1 | 3/2020 | Goldberg |

FOREIGN PATENT DOCUMENTS

| | | |
|---|---|---|
| CN | 111717169 A | 9/2020 |
| DE | 102018105420 A1 | 9/2018 |
| DE | 102020116432 A1 | 12/2020 |
| DE | 102020122361 A1 | 3/2021 |
| EP | 3481683 B1 | 10/2020 |
| FR | 3086620 B1 | 11/2020 |
| JP | 5494743 B2 | 5/2014 |
| RU | 2566169 C1 | 10/2015 |
| WO | 02072274 A1 | 9/2002 |
| WO | 2014010580 A1 | 1/2014 |
| WO | 2020023852 A1 | 1/2020 |

OTHER PUBLICATIONS

Kagan Göktürk, Alexander Jönsson "Developing a Resource-Efficient Sensor Cleaning System for Autonomous heavy vehicles", Master of Science Thesis, KTH Industrial Engineering and Management—Stockholm, Jun. 2019.
Russian Search Report dated Apr. 6, 2022 issued in respect of the counterpart Russian Patent Application No. RU 2021108154.
European Search Report dated Jul. 15, 2022 issued in respect of the related European Patent Application No. 22154092.5.
Russian Search Report dated Dec. 7, 2022 issued in respect of the counterpart Russian Patent Application No. RU 2021121629.

* cited by examiner

SYSTEM FOR AND METHOD OF CLEANING A SURFACE OF A SENSOR ON A SELF-DRIVING CAR

CROSS-REFERENCE

The present application claims priority to Russian Patent Application No. 2021108154, entitled "System for and Method of Cleaning a Surface of a Sensor on a Self-Driving Car", filed Mar. 26, 2021, the entirety of which is incorporated herein by reference.

TECHNICAL FIELD

The present technology relates generally to sensor cleaning systems; and in particular, to a system for and method of cleaning a surface of a sensor on a self-driving car.

BACKGROUND

Self-Driving Cars (SDCs) are vehicles that are able to autonomously drive themselves through private and/or public spaces. Using a system of sensors that detect the location and/or surroundings of the SDC, logic within or associated with the SDC controls the speed, propulsion, braking, and steering of the SDC based on the sensor-detected location and surroundings of the SDC.

A variety of sensor systems may be used by the SDC, such as but not limited to camera systems, radar systems, and LIDAR systems. Different sensor systems may be employed for capturing different information, and/or in different format, about the location and the surroundings of the SDC. For example, camera systems may be used for capturing image data about the surroundings of the SDC. In another example, LIDAR systems may be used to capture point cloud data for not only ranging objects but also building 3D map representations of the surroundings and other potential objects located in proximity to the SDC. Camera systems and LIDAR systems, amongst others, are implemented with one or more optical elements for capturing data. Weather factors such as rain and dirt may occlude optical elements of one or more sensor systems which reduces the quality of information gathered by the sensor systems for safely operating the SDC.

U.S. Pat. No. 9,505,382 discloses a nozzle for cleaning a lens surface of a camera. It includes a cleaning liquid path that guides a cleaning liquid to a discharge port and an air passage that guides compressed air to a discharge port. Furthermore, a distal end portion of the cleaning liquid path and a distal end portion of the air passage are disposed so as to be proximate to each other.

SUMMARY

Therefore, there is a need for systems and methods which avoid, reduce or overcome the limitations of the prior art.

In a first broad aspect of the present technology, there is provided a delivery unit for a cleaning system. The cleaning system is for cleaning a sensor system of a Self-Driving Car (SDC).

The sensor system and the cleaning system are mounted onto the SDC. The delivery unit comprises: a liquid nozzle for delivering a liquid jet and directing the liquid jet towards a surface of the sensor system; an air nozzle for delivering an air jet and directing the air jet towards the surface of the sensor system, and the liquid nozzle is located proximate to the air nozzle; a deflection orifice for delivering an other air jet for deflecting the liquid jet away from the air nozzle, and the air nozzle and the deflection orifice are in fluid communication with a single air manifold.

In some embodiments of the delivery unit, the liquid nozzle is in fluid communication with a reservoir through a liquid conduit of a liquid manifold, and the air nozzle is in fluid communication with an air inlet through an air conduit of the single air manifold. The air conduit is fluidly uncoupled from the liquid conduit.

In some embodiments of the delivery unit, the air conduit has a distal end and a proximal end. The proximal end is fluidly coupled to the air inlet. The distal end forms (i) a main chamber for providing air to the air nozzle and (ii) a secondary chamber for providing air to the deflection orifice.

In some embodiments of the delivery unit, the sensor system has a housing that has: a bottom plate for attachment to a surface of the SDC; one or more walls connecting the bottom plate to a top plate, and the surface of the sensor system is disposed inside the housing and facing outwardly towards the one or more walls; and the top plate defining the air conduit and the liquid conduit, and where the delivery unit is positioned on an edge of the top plate and oriented to deliver the air jet and the liquid jet towards the surface of the sensor system.

In some embodiments of the delivery unit, the surface of the SDC is a surface of at least one of: a roof, a front grill, and a side door of the SDC.

In a second broad aspect of the present technology, there is provided a cleaning system for cleaning a sensor system of a Self-Driving Car (SDC). The sensor system and the cleaning system are mounted onto the SDC. The cleaning system comprises: a reservoir for storing a cleaning liquid of the cleaning system; an air inlet for providing an air source to the cleaning system; a liquid manifold providing fluid communication between (i) the reservoir and a delivery unit; an air manifold for providing fluid communication between (ii) the air inlet and the delivery unit; a compressor unit for driving (i) the liquid from the reservoir to the delivery unit and (ii) the air from the air inlet to the delivery unit. The delivery unit includes: a liquid nozzle for delivering a liquid jet and directing the liquid jet towards a surface of the sensor system; an air nozzle for delivering an air jet and directing the air jet towards the surface of the sensor system, and where the liquid nozzle is located proximate to the air nozzle; and a deflection orifice for delivering an other air jet for deflecting the liquid jet away from the air nozzle, and where the air nozzle and the deflection orifice is in fluid communication with the air manifold.

In some embodiments of the cleaning system, the compressor unit includes (i) an air compressor for driving air from the air inlet to the delivery unit, and (ii) a liquid compressor for driving the cleaning liquid from the reservoir and the delivery unit.

In some embodiments of the cleaning system, the liquid nozzle is in fluid communication with the reservoir through a liquid conduit of a liquid manifold, and the air nozzle is in fluid communication with an air inlet through an air conduit of the air manifold. The air conduit is fluidly uncoupled from the liquid conduit.

In some embodiments of the cleaning system, the air conduit has a distal end and a proximal end. The proximal end is fluidly coupled to the air inlet. The distal end forms (i) a main chamber for providing air to the air nozzle and (ii) a secondary chamber for providing air to the deflection orifice.

In some embodiments of the cleaning system, the sensor system has a housing that has: a bottom plate attached to a surface of the SDC; one or more walls connecting the bottom plate to a top plate, and where the surface of the sensor system is disposed inside the housing and facing outwardly towards the one or more walls; and the top plate defining the air conduit and the liquid conduit. The delivery unit is positioned on an edge of the top plate and oriented to deliver the air jet and the liquid jet towards the surface of the sensor system.

In some embodiments of the cleaning system, the surface of the SDC is a surface of at least one of: a roof, a front grill, and a side door of the SDC.

In another broad aspect of the present technology, there is provided a method of cleaning a surface of a sensor system. The method is performed by a cleaning system comprising a delivery unit and a controller. The delivery unit includes a liquid nozzle, an air nozzle located proximate to the air nozzle, and a deflection orifice being in fluid communication with the air nozzle. The method comprises delivering, by the liquid nozzle, a liquid jet directed towards the surface of the sensor system, delivering, by the air nozzle, an air jet directed towards the surface of the sensor system, and delivering, by the deflection orifice, an other air jet directed away from the air nozzle and the surface of the sensor system. The delivering of the air jet is performed simultaneously with the delivering of the other air jet.

In some embodiments of the method, the delivering the liquid jet is performed during a liquid delivery phase of a given cleaning cycle and the delivering of the air jet and of the other air jet is performed during an air delivery phase of the given cleaning cycle. The method comprises performing a plurality of cleaning cycles including the given cleaning cycle.

In some embodiments of the method, the air delivery phase of the given cleaning cycle is performed immediately after the liquid delivery phase of the given cleaning cycle.

In some embodiments of the method, a time interval of the liquid delivery phase of the given cleaning cycle at least partially overlaps with an other time interval of the air delivery phase of the given cleaning cycle.

In some embodiments of the method, the given cleaning cycle further has an intermediate phase between the liquid delivery phase and the air delivery phase. The intermediate phase is for delaying the air delivery phase after performing the liquid delivery phase.

In some embodiments of the method, the given cleaning cycle further has an other liquid delivery phase.

In some embodiments of the method, the given cleaning cycle further has an other air delivery phase.

In some embodiments of the method, a number of cleaning cycles in the plurality of cleaning cycles is pre-determined by an operator of the cleaning system.

In some embodiments of the method, the method further comprises monitoring, by the controller, an indication of occlusion of the surface of the sensor system, and in response to the controller determining that an indication of occlusion is below a pre-determined threshold stopping, by the controller, operation of the delivery unit.

In the context of the present specification, the term "light source" broadly refers to any device configured to emit radiation such as a radiation signal in the form of a beam, for example, without limitation, a light beam including radiation of one or more respective wavelengths within the electromagnetic spectrum. In one example, the light source can be a "laser source". Thus, the light source could include a laser such as a solid-state laser, laser diode, a high power laser, or an alternative light source such as, a light emitting diode (LED)-based light source. Some (non-limiting) examples of the laser source include: a Fabry-Perot laser diode, a quantum well laser, a distributed Bragg reflector (DBR) laser, a distributed feedback (DFB) laser, a fiber-laser, or a vertical-cavity surface-emitting laser (VCSEL). In addition, the laser source may emit light beams in differing formats, such as light pulses, continuous wave (CW), quasi-CW, and so on. In some non-limiting examples, the laser source may include a laser diode configured to emit light at a wavelength between about 650 nm and 1150 nm. Alternatively, the light source may include a laser diode configured to emit light beams at a wavelength between about 800 nm and about 1000 nm, between about 850 nm and about 950 nm, between about 1300 nm and about 1600 nm, or in between any other suitable range. Unless indicated otherwise, the term "about" with regard to a numeric value is defined as a variance of up to 10% with respect to the stated value.

In the context of the present specification, an "output beam" may also be referred to as a radiation beam, such as a light beam, that is generated by the radiation source and is directed downrange towards a region of interest. The output beam may have one or more parameters such as: beam duration, beam angular dispersion, wavelength, instantaneous power, photon density at different distances from light source, average power, beam power intensity, beam width, beam repetition rate, beam sequence, pulse duty cycle, wavelength, or phase etc. The output beam may be unpolarized or randomly polarized, may have no specific or fixed polarization (e.g., the polarization may vary with time), or may have a particular polarization (e.g., linear polarization, elliptical polarization, or circular polarization).

In the context of the present specification, an "input beam" is radiation or light entering the system, generally after having been reflected from one or more objects in the ROI. The "input beam" may also be referred to as a radiation beam or light beam. By reflected is meant that at least a portion of the output beam incident on one or more objects in the ROI, bounces off the one or more objects. The input beam may have one or more parameters such as: time-of-flight (i.e., time from emission until detection), instantaneous power (e.g., power signature), average power across entire return pulse, and photon distribution/signal over return pulse period etc. Depending on the particular usage, some radiation or light collected in the input beam could be from sources other than a reflected output beam. For instance, at least some portion of the input beam could include light-noise from the surrounding environment (including scattered sunlight) or other light sources exterior to the present system.

In the context of the present specification, the term "surroundings" of a given vehicle refers to an area or a volume around the given vehicle including a portion of a current environment thereof accessible for scanning using one or more sensors mounted on the given vehicle, for example, for generating a 3D map of the such surroundings or detecting objects therein.

In the context of the present specification, a "Region of Interest" may broadly include a portion of the observable environment of a LiDAR system in which the one or more objects may be detected. It is noted that the region of interest of the LiDAR system may be affected by various conditions such as but not limited to: an orientation of the LiDAR system (e.g. direction of an optical axis of the LiDAR system); a position of the LiDAR system with respect to the environment (e.g. distance above ground and adjacent topography and obstacles); operational parameters of the LiDAR system (e.g. emission power, computational settings, defined angles of operation), etc. The ROI of LIDAR system may be defined, for example, by a plane angle or a solid angle. In one example, the ROI may also be defined within a certain distance range (e.g. up to 200 m or so).

In the context of the present specification, a "server" is a computer program that is running on appropriate hardware and is capable of receiving requests (e.g. from electronic devices) over a network, and carrying out those requests, or causing those requests to be carried out. The hardware may be implemented as one physical computer or one physical computer system, but neither is required to be the case with respect to the present technology. In the present context, the use of the expression a "server" is not intended to mean that every task (e.g. received instructions or requests) or any particular task will have been received, carried out, or caused to be carried out, by the same server (i.e. the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "electronic device" is any computer hardware that is capable of running software appropriate to the relevant task at hand. In the context of the present specification, the term "electronic device" implies that a device can function as a server for other electronic devices, however it is not required to be the case with respect to the present technology. Thus, some (non-limiting) examples of electronic devices include self-driving unit, personal computers (desktops, laptops, netbooks, etc.), smart phones, and tablets, as well as network equipment such as routers, switches, and gateways. It should be understood that in the present context the fact that the device functions as an electronic device does not mean that it cannot function as a server for other electronic devices.

In the context of the present specification, the expression "information" includes information of any nature or kind whatsoever capable of being stored in a database. Thus information includes, but is not limited to visual works (e.g. maps), audiovisual works (e.g. images, movies, sound records, presentations etc.), data (e.g. location data, weather data, traffic data, numerical data, etc.), text (e.g. opinions, comments, questions, messages, etc.), documents, spreadsheets, etc.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the words "first", "second", "third", etc. have been used as adjectives only for the purpose of allowing for distinction between the nouns that they modify from one another, and not for the purpose of describing any particular relationship between those nouns. Further, as is discussed herein in other contexts, reference to a "first" element and a "second" element does not preclude the two elements from being the same actual real-world element.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

These and other features, aspects and advantages of the present technology will become better understood with regard to the following description, appended claims and accompanying drawings where:

DETAILED DESCRIPTION

Figure 1:
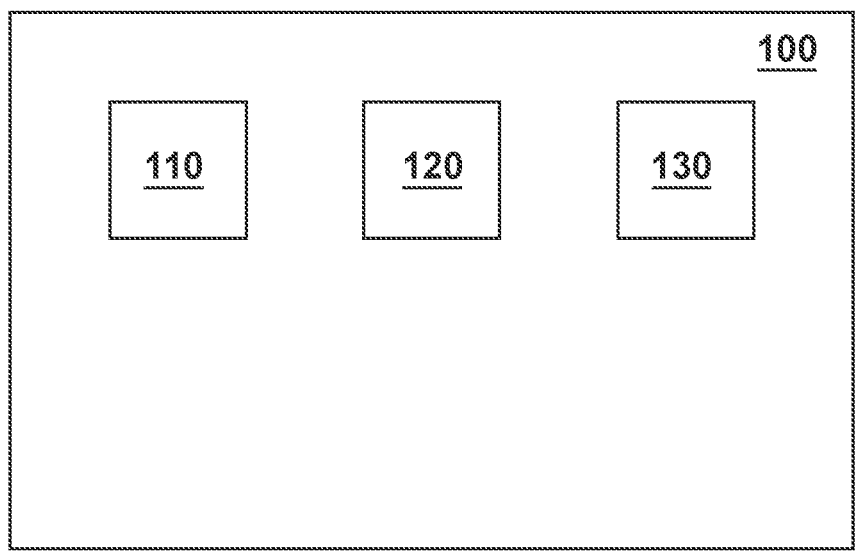
FIG. 1 depicts a schematic diagram of an example computer system configurable for implementing certain non-limiting embodiments of the present technology.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes which may be substantially represented in computer-readable media and so executed by a computer or processor, whether or not such computer or processor is explicitly shown.

The functions of the various elements shown in the figures, including any functional block labeled as a "processor", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

With these fundamentals in place, we will now consider some non-limiting examples to illustrate various implementations of aspects of the present technology.

Computer System

Referring initially to FIG. 1, there is depicted a schematic diagram of a computer system 100 suitable for use with some implementations of the present technology. The computer system 100 includes various hardware components including one or more single or multi-core processors collectively represented by a processor 110, a solid-state drive 120, and a memory 130, which may be a random-access memory or any other type of memory.

Communication between the various components of the computer system 100 may be enabled by one or more internal and/or external buses (not shown) (e.g. a PCI bus, universal serial bus, IEEE 1394 "Firewire" bus, SCSI bus, Serial-ATA bus, etc.), to which the various hardware components are electronically coupled. According to embodiments of the present technology, the solid-state drive 120 stores program instructions suitable for being loaded into the memory 130 and executed by the processor 110 for determining a presence of an object. For example, the program instructions may be part of a vehicle control application executable by the processor 110. It is noted that the computer system 100 may have additional and/or optional components (not depicted), such as network communication modules, localization modules, and the like.

Networked Computing Environment

Figure 2:
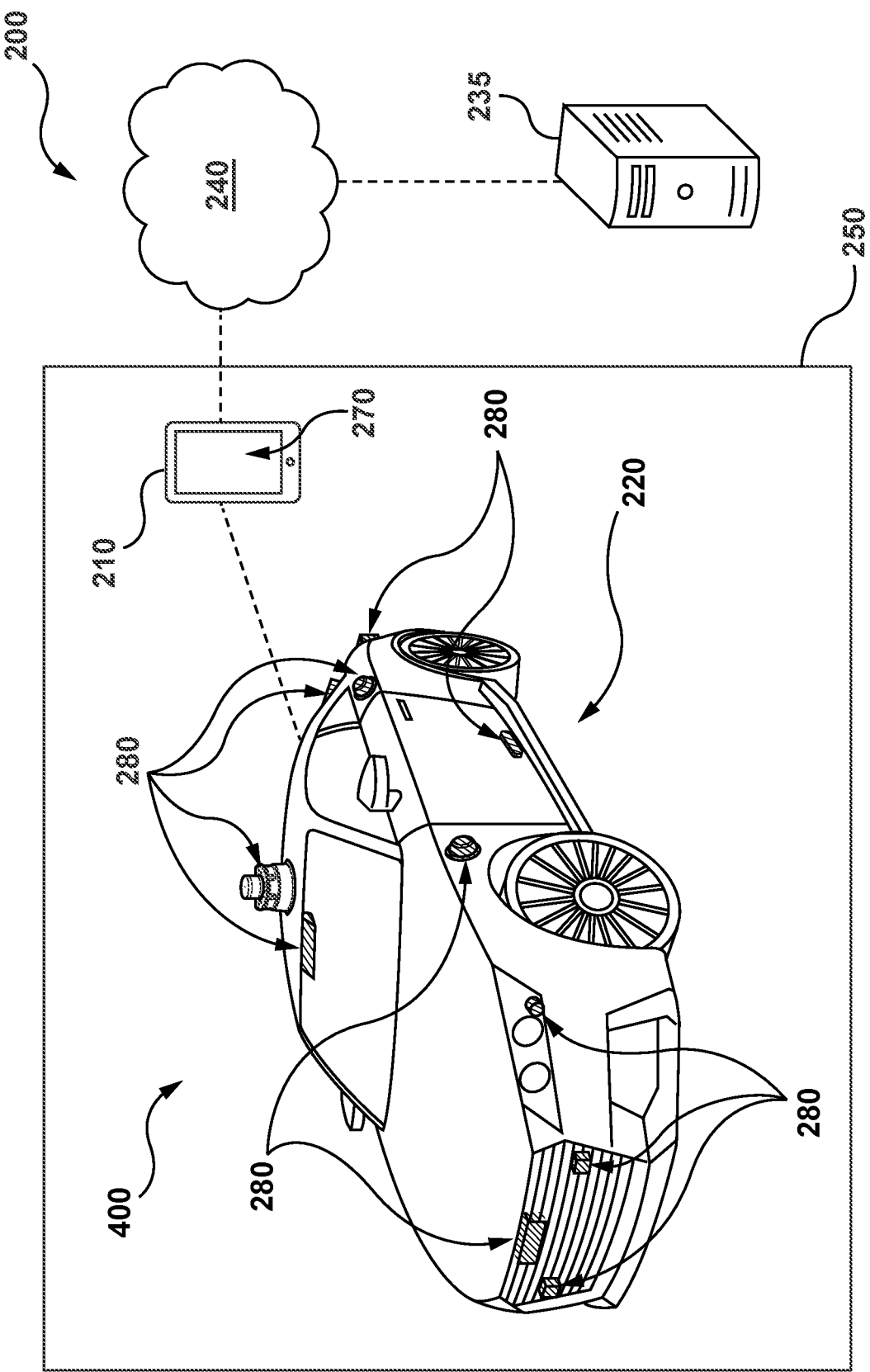
FIG. 2 depicts a schematic diagram of a networked computing environment being suitable for use with certain non-limiting embodiments of the present technology.

With reference to FIG. 2, there is depicted a networked computing environment 200 suitable for use with some non-limiting embodiments of the present technology. The networked computing environment 200 includes an electronic device 210 associated with a vehicle 220 and/or associated with a user (not depicted) who is associated with the vehicle 220 (such as an operator of the vehicle 220). The environment 200 also includes a server 235 in communication with the electronic device 210 via a communication network 240 (e.g. the Internet or the like, as will be described in greater detail herein below).

In at least some non-limiting embodiments of the present technology, the electronic device 210 is communicatively coupled to control systems of the vehicle 220. The electronic device 210 could be arranged and configured to control different operations systems of the vehicle 220, including but not limited to: an ECU (engine control unit), steering systems, braking systems, and signaling and illumination systems (i.e. headlights, brake lights, and/or turn signals). In such an embodiment, the vehicle 220 could be a self-driving vehicle 220.

In some non-limiting embodiments of the present technology, the networked computing environment 200 could include a GPS satellite (not depicted) transmitting and/or receiving a GPS signal to/from the electronic device 210. It will be understood that the present technology is not limited to GPS and may employ a positioning technology other than GPS. It should be noted that the GPS satellite can be omitted altogether.

The vehicle 220, to which the electronic device 210 is associated, could be any transportation vehicle, for leisure or otherwise, such as a private or commercial car, truck, motorbike or the like. Although the vehicle 220 is depicted as being a land vehicle, this may not be the case in each and every non-limiting embodiment of the present technology. For example, in certain non-limiting embodiments of the present technology, the vehicle 220 may be a watercraft, such as a boat, or an aircraft, such as a flying drone.

The vehicle 220 may be user operated or a driver-less vehicle. In some non-limiting embodiments of the present technology, it is contemplated that the vehicle 220 could be implemented as a Self-Driving Car (SDC). It should be noted that specific parameters of the vehicle 220 are not limiting, these specific parameters including for example: vehicle manufacturer, vehicle model, vehicle year of manufacture, vehicle weight, vehicle dimensions, vehicle weight distribution, vehicle surface area, vehicle height, drive train type (e.g. 2× or 4×), tire type, brake system, fuel system, mileage, vehicle identification number, and engine size.

According to the present technology, the implementation of the electronic device 210 is not particularly limited. For example, the electronic device 210 could be implemented as a vehicle engine control unit, a vehicle CPU, a vehicle navigation device (e.g. TomTom™, Garmin™), a tablet, a personal computer built into the vehicle 220, and the like. Thus, it should be noted that the electronic device 210 may or may not be permanently associated with the vehicle 220. Additionally or alternatively, the electronic device 210 could be implemented in a wireless communication device such as a mobile telephone (e.g. a smart-phone or a radio-phone). In certain embodiments, the electronic device 210 has a display 270.

The electronic device 210 could include some or all of the components of the computer system 100 depicted in FIG. 1, depending on the particular embodiment. In certain embodiments, the electronic device 210 is an on-board computer device and includes the processor 110, the solid-state drive 120 and the memory 130. In other words, the electronic device 210 includes hardware and/or software and/or firmware, or a combination thereof, for processing data as will be described in greater detail below.

In some non-limiting embodiments of the present technology, the communication network 240 is the Internet. In alternative non-limiting embodiments of the present technology, the communication network 240 can be implemented as any suitable local area network (LAN), wide area network (WAN), a private communication network or the like. It should be expressly understood that implementations for the communication network 240 are for illustration purposes only. A communication link (not separately numbered) is provided between the electronic device 210 and the communication network 240, the implementation of which will depend, inter alia, on how the electronic device 210 is implemented. Merely as an example and not as a limitation, in those non-limiting embodiments of the present technology where the electronic device 210 is implemented as a wireless communication device such as a smartphone or a navigation device, the communication link can be implemented as a wireless communication link. Examples of wireless communication links may include, but are not limited to, a 3G communication network link, a 4G communication network link, and the like. The communication network 240 may also use a wireless connection with the server 235.

In some embodiments of the present technology, the server 235 is implemented as a computer server and could include some or all of the components of the computer system 100 of FIG. 1. In one non-limiting example, the server 235 is implemented as a Dell™ PowerEdge™ Server running the Microsoft™ Windows Server™ operating system, but can also be implemented in any other suitable hardware, software, and/or firmware, or a combination thereof. In the depicted non-limiting embodiments of the present technology, the server 235 is a single server. In alternative non-limiting embodiments of the present technology, the functionality of the server 235 may be distributed and may be implemented via multiple servers (not shown).

In some non-limiting embodiments of the present technology, the processor 110 of the electronic device 210 could be in communication with the server 235 to receive one or more updates. Such updates could include, but are not limited to, software updates, map updates, routes updates, weather updates, and the like. In some non-limiting embodiments of the present technology, the processor 110 can also be configured to transmit to the server 235 certain operational data, such as routes travelled, traffic data, performance data, and the like. Some or all such data transmitted between the vehicle 220 and the server 235 may be encrypted and/or anonymized.

It should be noted that a variety of sensors and systems may be used by the electronic device 210 for gathering information about surroundings 250 of the vehicle 220. As seen in FIG. 2, the vehicle 220 may be equipped with a plurality of sensor systems 280. It should be noted that different sensor systems from the plurality of sensor systems 280 may be used for gathering different types of data regarding the surroundings 250 of the vehicle 220.

In one example, the plurality of sensor systems 280 may include various optical systems including, inter alia, one or more camera-type sensor systems that are mounted to the vehicle 220 and communicatively coupled to the processor 110 of the electronic device 210. Broadly speaking, the one or more camera-type sensor systems may be configured to gather image data about various portions of the surroundings 250 of the vehicle 220. In some cases, the image data provided by the one or more camera-type sensor systems could be used by the electronic device 210 for performing object detection procedures. For example, the electronic device 210 could be configured to feed the image data provided by the one or more camera-type sensor systems to an Object Detection Neural Network (ODNN) that has been trained to localize and classify potential objects in the surroundings 250 of the vehicle 220.

In another example, the plurality of sensor systems 280 could include one or more radar-type sensor systems that are mounted to the vehicle 220 and communicatively coupled to the processor 110. Broadly speaking, the one or more radar-type sensor systems may be configured to make use of radio waves to gather data about various portions of the surroundings 250 of the vehicle 220. For example, the one or more radar-type sensor systems may be configured to gather radar data about potential objects in the surroundings 250 of the vehicle 220, such data potentially being representative of a distance of objects from the radar-type sensor system, orientation of objects, velocity and/or speed of objects, and the like.

In a further example, the plurality of sensor systems 280 could include one or more Light Detection and Ranging (LIDAR) systems that are mounted to the vehicle 220 and communicatively coupled to the processor 110. Broadly speaking, a LIDAR system is configured to capture data about the surroundings 250 of the vehicle 220 used, for example, for building a multi-dimensional map of objects in the surroundings 250 of the vehicle 220. The LIDAR system could be mounted, or retrofitted, to the vehicle 220 in a variety of locations and/or in a variety of configurations for gathering information about surroundings 250 of the vehicle 220.

For example, depending on the implementation of the vehicle 220 and the LIDAR system, the LIDAR system could be mounted on an interior, upper portion of a windshield of the vehicle 220. Nevertheless, other locations for mounting the lidar system are within the scope of the present disclosure, including on a back window, side windows, front hood, rooftop, front grill, front bumper or the side of the vehicle 220.

Dedicated Enclosure

It should be noted that a LIDAR system can be mounted in combination with one or more camera systems in a dedicated enclosure mounted on the top of the vehicle 220.

Figure 4:
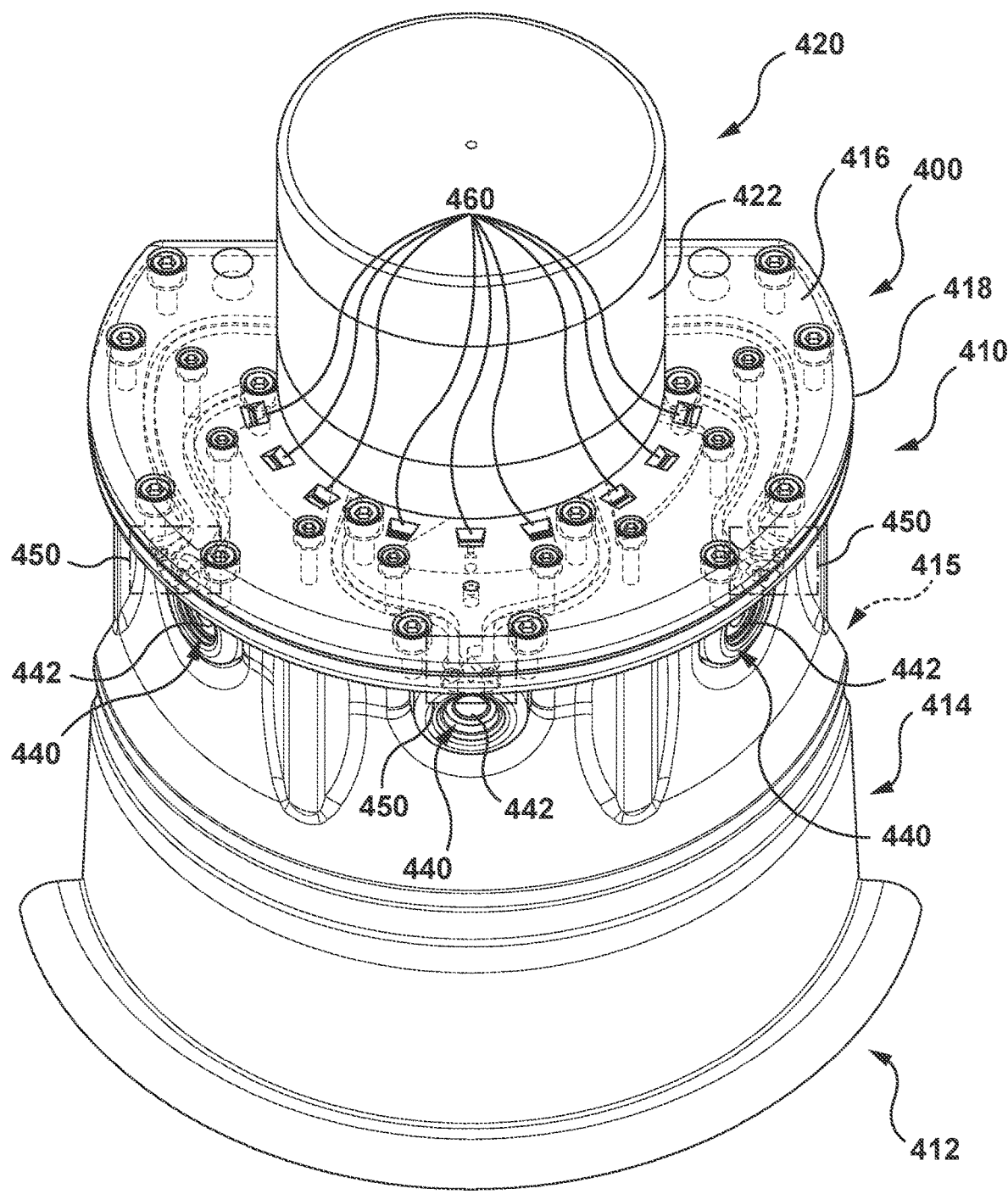
FIG. 4 is a top front perspective view of a housing having camera sensors and a lower top plate as implemented in accordance with some non-limiting embodiments of the present technology.

With a brief reference to FIG. 4, there is depicted a top front perspective view of a housing 410 of the dedicated enclosure. Broadly speaking, the housing 410 has a bottom plate 412, a side wall 414, a back wall 415 and top plates 416 and 418. In some embodiments of the present technology, the sidewall 414 may be a curved wall.

The bottom plate 412 is for attaching the housing 410 to a surface of the vehicle 220 (e.g., the top surface of the roof). The side wall 414 and the back wall 415 connect the bottom plate 412 to the top plates 416 and 418. The side wall 414 has a plurality of orifices (not numbered) for positioning sensor surfaces 442 of camera sensor systems 440. It should be noted that the housing 410 defines an interior space for accommodating inter alia the camera sensor systems 440 therein. In the non-limiting example of FIG. 4, the camera sensor systems 440 are accommodated in the housing 410 such that the sensor surfaces 442 are aligned with the respective orifices in the side wall 414. It can be said that the orifices of the side wall 414 are positioned for increasing the combined field of view of the camera sensor systems 440. It can be said that the camera sensor systems 440 are spaced apart so as to increase the field of view.

In other embodiments, instead of having the side wall 414 and the back wall 415, the housing 410 may have only one generally cylindrical wall. In such a configuration, it is contemplated that additional camera sensor systems may be accommodated in the housing 410 for increasing the combined field of view of the camera sensor systems 440. In other embodiments, the housing 410 may have a plurality of walls having other geometric configuration. It should be noted that the number of walls of the housing 410, and their shape may depend on inter alia specific implementations of the present technology.

As mentioned above, the housing 410 has (i) the lower top plate 418 attached to the side wall 414 and the back wall 415, and (ii) the upper top plate 416 attached to the lower top plate 418. It should be noted that the lower top plate 418 and the upper top plate 416 have a curved edge. The side wall 414 is connected to the bottom surface of the lower top plate 418 near the curved edge of the lower top plate 418. The LIDAR system 420 is attached on top of the upper top plate 416 and has a sensor surface 422. The upper top plate 416 and the lower top plate 418 are separated by a gasket (not numbered). In some embodiments of the present technology, the lower top plate 418 and the upper top plate 416 may be integrally formed.

During operation of the vehicle 220, one or more sensor surfaces 442 and 422 may become at least partially occluded due to one or more weather factors. For example, rain and dirt may occlude the one or more sensor surfaces which reduces the quality of information provided by the camera sensors 440 and/or the LIDAR sensor 420. Developers of the present technology have devised a cleaning system 300 (schematically depicted in FIG. 3) for cleaning one or more surfaces of sensor systems. The cleaning system 300 is configured to deliver cleaning liquid and air onto one or more surfaces of the sensor systems for cleaning purposes.

As it can be seen on FIG. 4, the lower top plate 418 includes a plurality of delivery units 450 for delivering liquid and air onto respective ones from the plurality of cleaning surfaces 442 and the upper top plate 416 includes a plurality of delivery units 460 for delivering liquid and air onto the surface 422 of the LIDAR sensor 420. The delivery units 450 are part of the cleaning system 300.

How the cleaning system 300 can be implemented in some embodiments of the present technology for cleaning one or more sensor surfaces, and how the lower top plate 418 may be configured for implementing inter alia the plurality of delivery units 450 of the cleaning system 300 will now be discussed in turn.

Cleaning System

Figure 3:
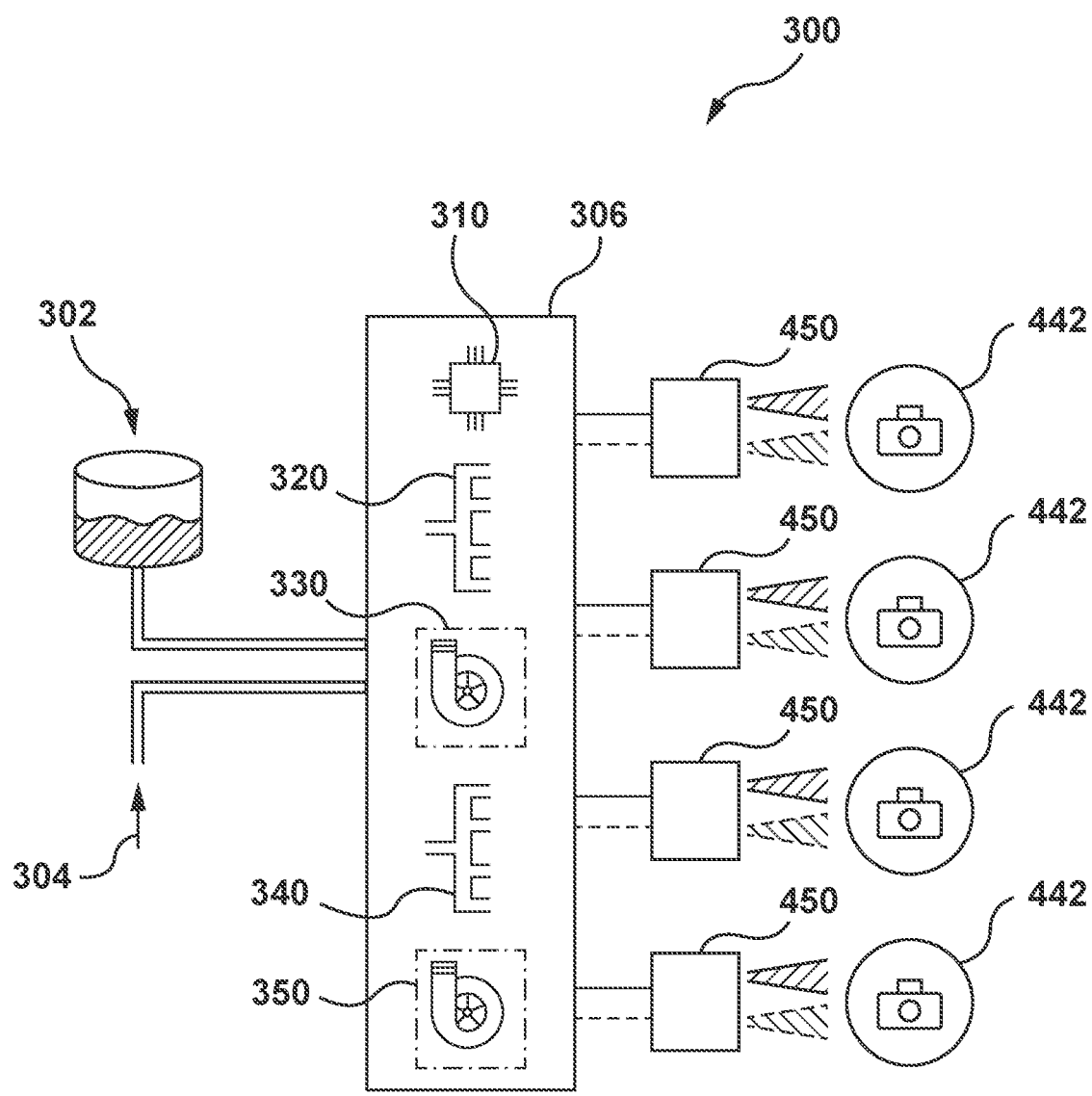
FIG. 3 depicts a schematic diagram of a cleaning system implemented in accordance with some non-limiting embodiments of the present technology.

With reference to FIG. 3, there is depicted a schematic illustration of the cleaning system 300. The cleaning system 300 comprises the plurality of delivery units 450 (also seen on FIG. 4), a reservoir 302 for containing cleaning liquid, an air inlet 304 for providing an air source, and a control sub-system 306 for providing fluid communication between the reservoir 302, the air inlet 304 and the plurality of delivery units 450 and for controlling the cleaning system 300.

The control sub-system 306 includes a liquid manifold 320 for guiding the liquid from the reservoir 302 to the plurality of delivery units 450, and a liquid compressor 330 for driving the liquid through the liquid manifold 320. Also, the control sub-system 306 includes an air manifold 340 for guiding the air from the air inlet 304 to the plurality of delivery units 450, and an air compressor 350 for driving the air through the air manifold 340.

The control sub-system 306 also has a controller 310 that may include one or more processors, an application-specific integrated circuit (ASIC), a field-programmable gate array (FPGA), and/or other suitable circuitry. The controller 310 may also include non-transitory computer-readable memory to store instructions executable by the controller 310 as well as data which the controller 310 may produce based on the signals acquired from other internal components of the sensor systems and/or may provide signals to the other internal components of the sensor systems. The memory can include volatile (e.g., RAM) and/or non-volatile (e.g., flash memory, a hard disk) components. The controller 310 may be configured to generate data during operation and store it in the memory. For example, this data generated by the controller 310 may be used for triggering cleaning of one or more sensor surfaces by the cleaning system 300. It is contemplated that, in at least some non-limiting embodiments of the present technology, the controller 310 could be implemented in a manner similar to that of implementing the electronic device 210 and/or the computer system 100, without departing from the scope of the present technology.

Developers of the present technology have realized that delivery units 450 of the cleaning system 300 should be compact in size due to geometrical and weight requirements of the housing 410 and/or of one or more sensor systems accommodated therein. In one example, the delivery unit 450 should be compact enough for providing both air and liquid onto a respective sensor surface 442. In the illustrated example, the sensor surface 442 of a given camera sensor system 440 has a surface area of 24.5 mm$^2$. For example, a camera's window may be 17.5 mm in diameter. As it will be described herein further below in greater details, designing and implementing a compact delivery unit is a challenging task due to the close proximity of liquid and air jets during operation of the cleaning system 300 and, thus, potential "contamination" of air stream with remaining fluid.

As previously alluded to, the lower top plate 418 defines and/or accommodates at least some components of the cleaning system 300. How the lower top plate 418 is configured for defining and/or accommodating at least some components of the cleaning system 300 will now be discussed.

Lower Top Plate

Figure 5:
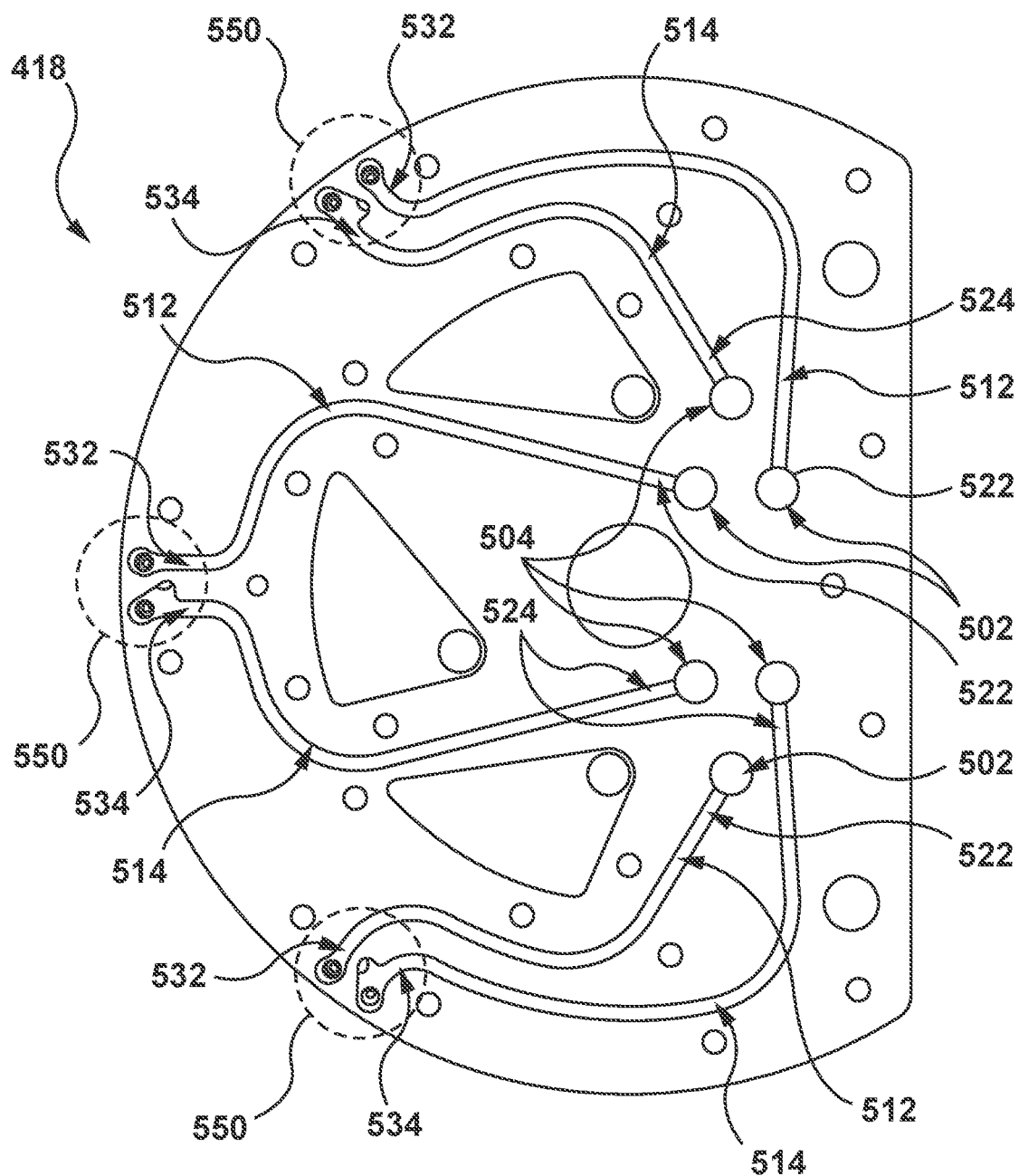
FIG. 5 is a top plane view of a lower top plate of FIG. 4, in accordance with some non-limiting embodiments of the present technology.
Figure 6:
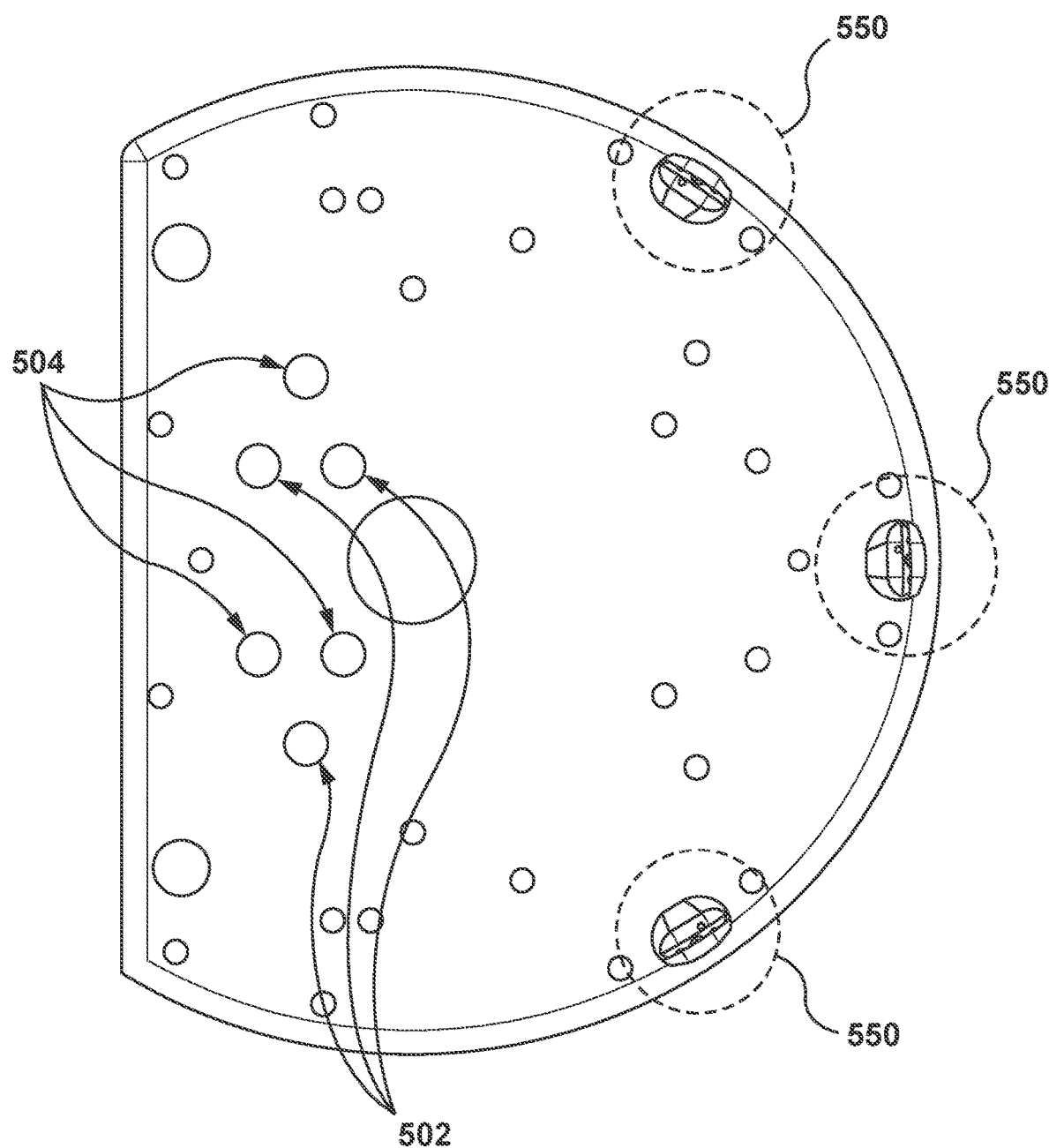
FIG. 6 is a bottom plane view of the lower top plate of FIG. 4, in accordance with some non-limiting embodiments of the present technology.

With reference to both FIGS. 5 and 6, there is depicted a top plan view and a bottom plan view, respectively, of the lower top plate 418. The lower top plate 418 has liquid inlets 502 and air inlets 504. Liquid conduits 512 and air conduits 514 are defined in the top surface of the lower top plate 418. The liquid inlets 502 provide fluid communication between the respective liquid conduits 512 and the rest of the liquid manifold 320 of the cleaning system 300. The liquid conduits 512 guide cleaning liquid from the respective liquid inlets 502 to the respective delivery units 450. The air inlets 504 provide fluid communication between the respective air conduits 514 and the rest of the air manifold 340 of the cleaning system 300. The air conduits 514 guide air from the respective air inlets 504 to the respective delivery units 450. In one non-limiting example, the housing 410 provides interior room for liquid communication channels and for air communication channels that guide cleaning liquid to the liquid inlets 502 and air to the air inlets 504, respectively.

It is contemplated that the liquid conduits 512 defined in the lower top plate 418 may be part of the liquid manifold 320 of the cleaning system 300 and that the air conduits 514 defined in the lower top plate 418 may be part of the air manifold 340 of the cleaning system 300. It should also be noted that liquid conduits 512 and the air conduits 514 are not in fluid communication amongst each other. In other words, the liquid conduits 512 are dedicated for guiding the cleaning liquid of the cleaning system 300 while the air conduits are dedicated for guiding the air of the cleaning system 300.

The lower top plate 418 also has a number of delivery zones 550, each of which includes a respective delivery unit 450. The delivery zones 550 are disposed near the curved edge of the lower top plate 418 and are positioned on the lower top plate 418 so as to match the respective sensor surfaces 442 on the side wall 414. The number of delivery zones 550 depends on a number of sensor surfaces 442 of the camera sensor systems 440 in the housing 410.

It should be noted that the liquid conduits 512 have respective proximal ends 522 that are fluidly coupled with the respective liquid inlets 502 and have respective distal ends 532 that are located in the respective delivery zones 550. Similarly, the air conduits 514 have respective proximal ends 524 that are fluidly coupled with the respective air inlets 504 and have respective distal ends 534 that are located in the respective delivery zones 550.

Delivery Zone and Delivery Unit

Figure 7:
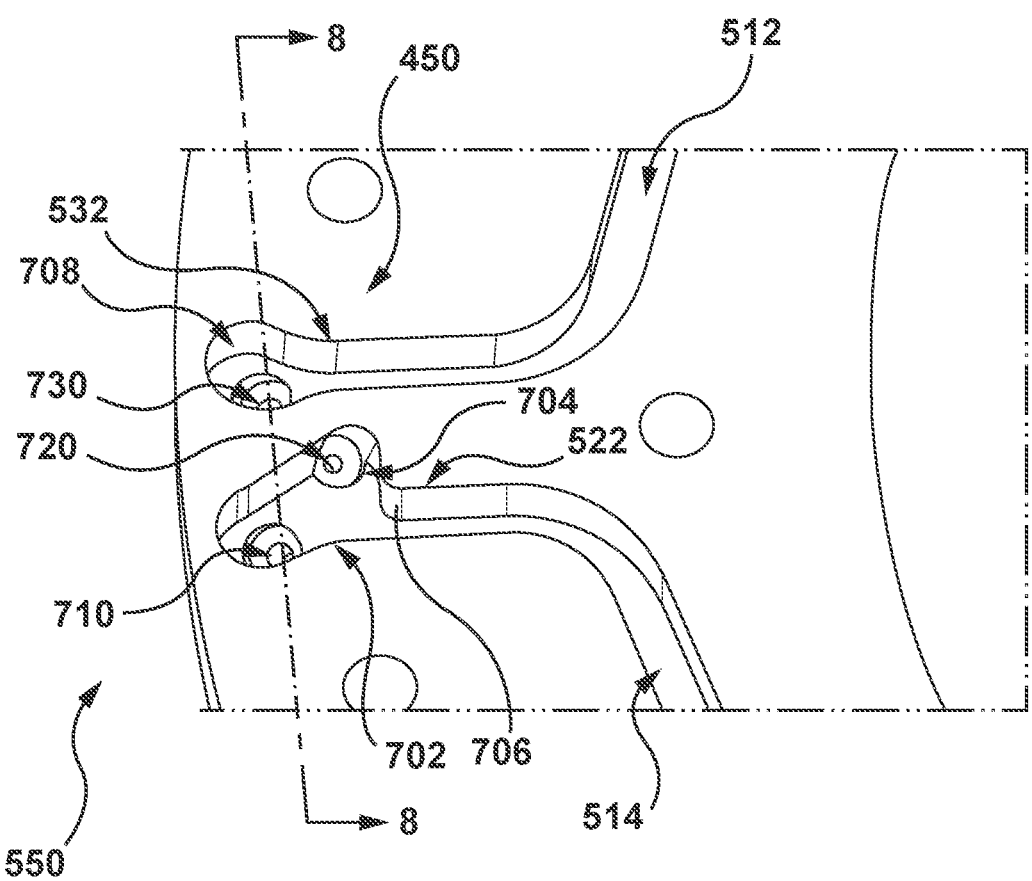
FIG. 7 is a zoomed-in top left perspective view of a delivery zone of the lower top plate of FIG. 4, in accordance with some non-limiting embodiments of the present technology.

To better illustrate a given delivery zone 550 including the respective delivery unit 450, reference will now be made to FIG. 7 depicting a top left perspective view of the lower top plate 418 and zoomed-in on a given delivery zone 550.

As seen, the distal end 532 of the liquid conduit 512 is located in the delivery zone 550 and terminates in a liquid chamber 708 defined in the top surface of the lower top plate 418. A liquid nozzle 730 is located in the delivery zone 550 of the lower top plate 418 and is configured for delivering liquid from the liquid chamber 708. The liquid chamber 708 is for providing a constant pressure of liquid during operation of the cleaning system 300.

Also, the distal end 534 of the air conduit 514 is located in the delivery zone 550 and terminates in a main chamber 702 and a secondary chamber 704 defined in the top surface of the lower top plate 418. As seen, the distal end 534 has a curved corner 706 that helps defining the secondary chamber 704 in addition to the main chamber 702. An air nozzle 710 is located in the delivery zone 550 of the lower top plate 418 and is configured for delivering air from the main chamber 702. A deflection orifice 720 is located in the delivery zone 550 of the lower top plate 418 and is configured for delivering air from the secondary chamber 704. The main chamber 702 is for providing constant pressure of air delivered through the air nozzle 710 during operation of the cleaning system 300. The secondary chamber 704 is for avoiding turbulence and providing contestant pressure of air delivered through the deflection orifice 720. It is contemplated that the curved corner 706 may help in reducing turbulence in the secondary chamber if compared to a sharp corner, for example.

In the context of the present technology, it can be said that the delivery unit 450 of the cleaning system 300 comprises the liquid nozzle 730 for delivering a liquid jet and directing the liquid jet towards a respective sensor surface 442, the air nozzle 710 for delivering an air jet and directing the air jet towards the respective sensor surface 442, and the deflection orifice 720 for delivering an other air jet for deflecting residue liquid from the air nozzle 710 and/or from the path of the air jet delivered by the air nozzle 710 and/or from the respective sensor surface 442.

It should be noted that the liquid nozzle 730 and the air nozzle 710 are in close proximity to each other due to the compactness requirements of the delivery unit 450. Having the liquid nozzle in proximity to the air nozzle 710 may cause contamination of the air jet with liquid residue which results in a decreased cleaning performance of a delivery unit. For that reason, developers of the present technology have devised the delivery unit 450 that further has the deflection orifice 720 for deflecting liquid residue from the liquid nozzle 730 away from the air nozzle 710 and/or from the path of the air jet delivered by the air nozzle 710 and/or from the respective sensor surface 442 during operation of the cleaning system 300.

As seen on FIG. 7, the liquid nozzle 730 and the air nozzle 710 are located at a same distance away from the curved edge of the top surface of the lower top plate 418. However, the deflection orifice 720 is located further away than the liquid nozzle 730 and the air nozzle 710 from the curved edge of the top surface of the lower top plate 418. As a result, it can be said that the air nozzle 710, the deflection orifice 720 and the liquid nozzle 730 are located in a "triangular configuration" on the top surface of the lower top plate 418, with the deflection orifice 720 being the furthest away from the edge of the top surface of the lower top plate 418. In at least some embodiments, developers of the present technology have realized that providing the air nozzle 710, the deflection orifice 720 and the liquid nozzle 730 in such a triangular configuration allows to reduce the size of the delivery unit 450, if compared for example to a configuration where the nozzles 710 and 730 and the deflection orifice 720 are all equidistant from the curved edge of the top surface of the lower top plate 418.

Figure 8:
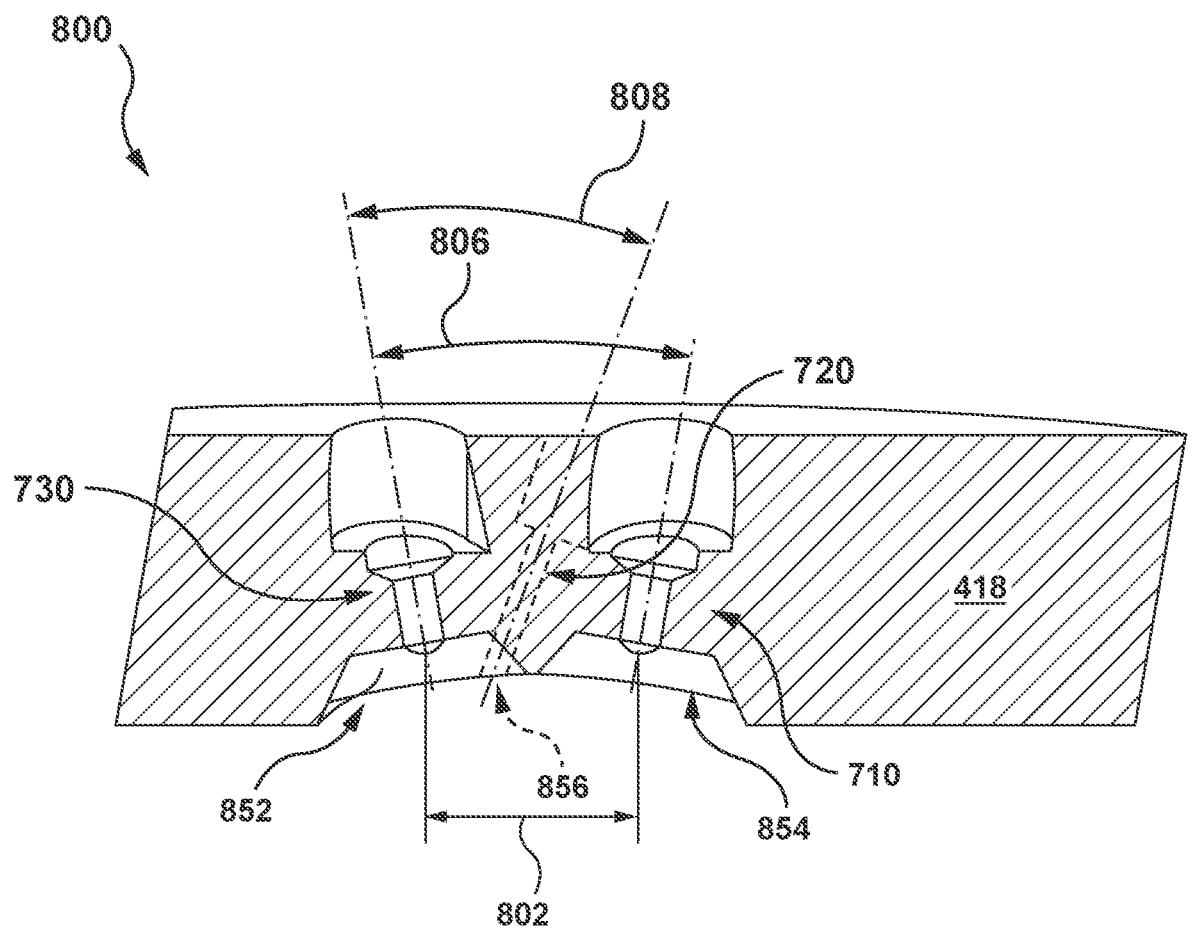
FIG. 8 is a cross-sectional view, taken through line 8-8 of FIG. 7, of the delivery zone of FIG. 7, in accordance with some non-limiting embodiments of the present technology.

With reference to FIG. 8, there is depicted a cross-sectional view 800, taken through the line 8-8 of FIG. 7, and which illustrates how the air nozzle 710, the deflection orifice 720 and the liquid nozzle 730 extend through the lower top plate 418, from the top surface to the bottom surface thereof.

It should be noted that the air nozzle 710, the deflection orifice 720 and the liquid nozzle 730 do not extend vertically through the lower top plate 418. As seen, the air nozzle 710 and the liquid nozzle 730 are angled towards each other as they extend from the top surface to the bottom surface of the lower top plate 418. In the illustrated example, the air nozzle 710 and the liquid nozzle 730 extend through the lower top plate 418 and are at an angle 806 from one another. The angle 806 is about 20 degrees.

It can be said that a distance 802 between the air nozzle 710 and the liquid nozzle 730 on the bottom surface of the lower top plate 418 is smaller than the distance between them on the top surface of the lower top plate 418. The distance 802 between the air nozzle 710 and the liquid nozzle 730 on the bottom surface of the lower top plate 418 is about 7.7 millimetres. The angle 806 resulting in a "reduced inter-nozzle" distance 802 on the bottom surface of the lower top plate 418 can further help in reducing the size of the delivery unit 450. The angle 806 can also allow directing the liquid jet and the air jet towards a center of the respective sensor surface 442.

It should also be noted that both the air nozzle 710 and the liquid nozzle 730 are also angularly tilted away from the edge of the lower top plate 418 as they extend through the lower top plate 418, such that they are further away from the curved edge of the lower top plate 418 on the bottom surface thereof than on the top surface thereof. It can be said that the air nozzle 710 and the liquid nozzle 730 being closer to the curved edge on the top surface of the lower top plate 418 than on the bottom surface of the lower top plate 418 allow directing their respective jets towards a center of the respective sensor surface 442.

In some embodiments of the present technology, it can be said that the air nozzle 710 and the liquid nozzle 730 extend through the lower top plate 418 such that an air path in the air nozzle 710 and a liquid path in the liquid nozzle 730 are angled in the lower top plate 418 such that their respective jets are delivered in close proximity to each other and towards the center of the respective sensor surface 442.

Also, the deflection orifice 720 is angled towards the liquid nozzle 730 as it extends from the top surface to the bottom surface of the lower top plate 418. In the illustrated example, the deflection orifice 720 extends through the lower top plate at an angle 808 with the liquid nozzle 730. The angle 808 may be 45 degrees. It is contemplated that the angle 808 may be 80 degrees. It is contemplated that the angle 808 may be between 0 and 90 degrees.

It can be said that a distance between the deflection orifice 720 and the liquid nozzle 730 on the bottom surface of the lower top plate 418 is smaller than the distance between them on the top surface of the lower top plate 418. Having the deflection orifice 720 and the liquid nozzle 730 at the angle 808 allows reducing the size of the delivery unit 450 and may allow directing the deflection jet away from the air nozzle 710 and/or away from the air jet and/or away from the respective sensor surface 442.

It should also be noted that the deflection orifice 720 is also angled towards the curved edge of the lower top plate 418 as it extends through the lower top plate 418, such the deflection orifice 720 is closer to the curved edge of the lower top plate 418 on the bottom surface thereof than on the top surface thereof. It can be said that having the deflection orifice 720 angled in the lower top plate 418 such that it is closer to the curved edge of the lower top plate 418 on the bottom surface thereof than on the top surface thereof allows directing the deflection jet away from the air nozzle 710 and/or away from the air jet and/or away from the respective sensor surface 442.

In some embodiments of the present technology, it can be said that the air path in the deflection orifice 720 is angled in the lower top plate 418 such that the deflection jet delivered by the deflection orifice 720 is in proximity to the liquid jet of the liquid nozzle 730 and in a direction that allows deflecting liquid residue away from the air nozzle 710 and/or away from the air jet and/or away from the respective sensor surface 442.

As seen on FIG. 8, the delivery zone 550 also accommodates jet diffusors 852 and 854. The purpose of the jet diffusor 852 is to shape the liquid jet delivered by the liquid nozzle 730 and the purpose of the jet diffusor 854 is to shape the air jet delivered by the air nozzle 710. In the illustrated example, the jet diffusors 852 and 854 both have a "cat-eye" opening allowing the respective jets to have elliptical profiles. In other embodiments of the present technology, however, the liquid jet and the air jet may be shaped by diffusors with a variety of openings such that the liquid and the air jet have other profiles. Other jet profiles may depend on inter alia specific implementations of the present technology. It is contemplated that the deflection orifice 720 may terminate in the jet diffusor 852 on the bottom surface of the lower top plate 418 so as to be in proximity to the liquid jet generated by the liquid nozzle 730 during operation.

Operation

During operation of the cleaning system 300 (see FIG. 3), the controller 310 may be configured to trigger one or more cleaning cycles of the sensor surfaces 442. The controller 310 may be configured to monitor information indicative of how occluded one or more camera sensor systems 440 are. For example, one or more signals may be received by the controller 310 from the one or more camera sensor systems 440 carrying such information. In another example, one or more signals may be received by the controller 310 from the electronic device 210 carrying such information. Irrespective of how such information is acquired, the controller 310 may use this information for triggering one or more cleaning cycles of the cleaning system 300.

Broadly speaking, a given cleaning cycle performed by the cleaning system 300 includes two main phases, namely (i) a liquid delivery phase and (ii) an air delivery phase.

Figure 9:
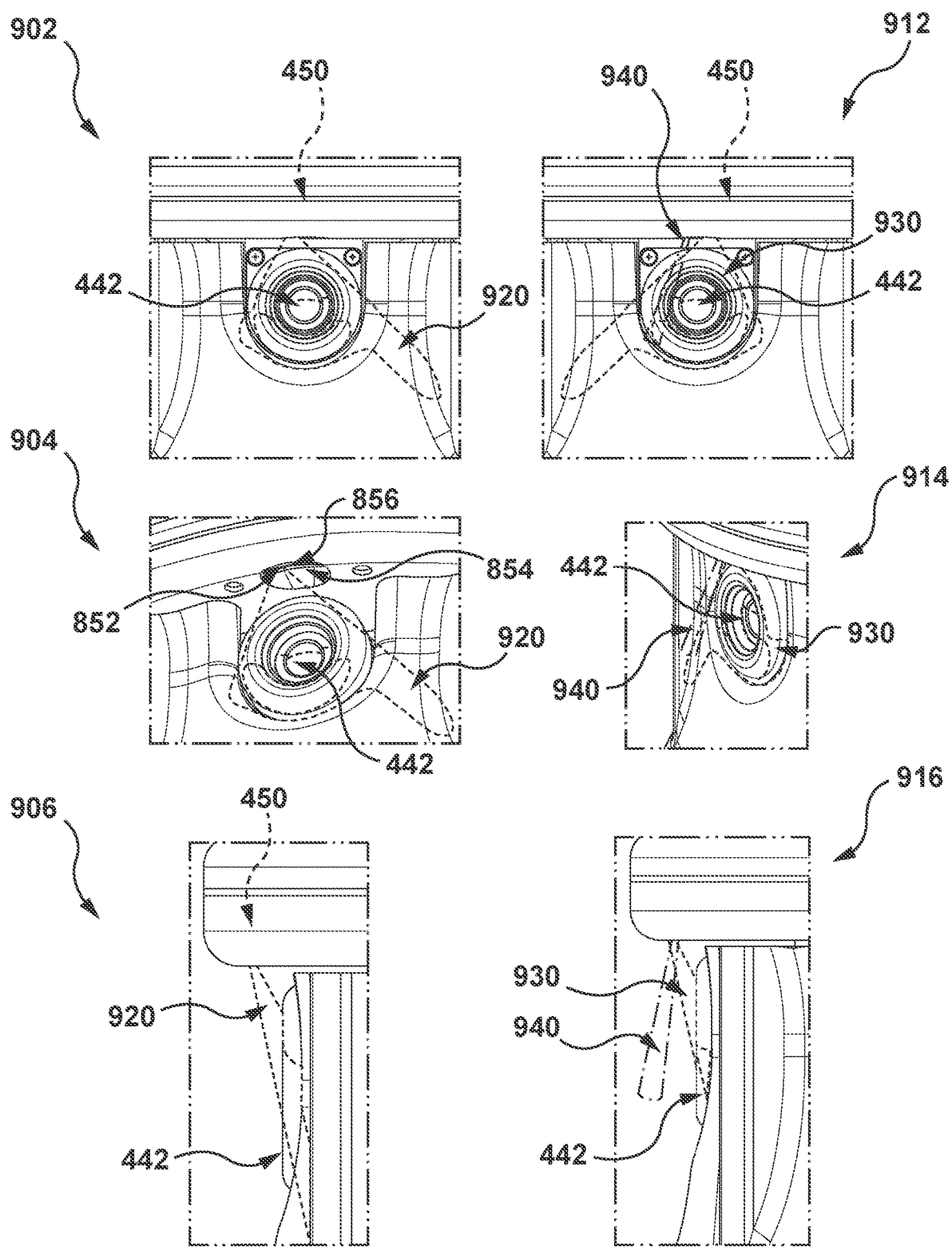
FIG. 9 depicts a set of views illustrating a liquid delivery phase and an air delivery phase of a cleaning cycle of the cleaning system of FIG. 3, in accordance with some non-limiting embodiments of the present technology.

During the liquid delivery phase, the controller 310 triggers the liquid compressor 330 to drive cleaning liquid from the reservoir 302 through the liquid manifold 320 so as to be delivered by one or more liquid nozzles 730. With reference to FIG. 9, there is depicted three representations 902, 904 and 906 of how a liquid jet 920 is generated and delivered by the delivery unit 450 (the liquid nozzle 730 thereof) onto the respective sensor surface 442. As previously alluded to, the angled configuration of the liquid nozzle 730 in the lower top plate 418 allows the liquid jet 920 to be oriented towards the center of the respective sensor surface 442. Also, as it can be seen on the three representations 902, 904, and 906, the liquid jet 920 is shaped by the diffusor 852 into a liquid jet having an elliptical profile. In some embodiments, it is contemplated that having the liquid jet 920 delivered with an elliptical profile may allow increasing the effective area of the respective sensor surface 442 that receives the liquid jet 920.

During the current cleaning cycle, the air delivery phase may begin immediately after the liquid delivery phase (for example, immediately after the delivery of the liquid jet 920). In some embodiments, however, it is contemplated that an intermediate phase may be present between the liquid delivery phase and the air delivery phase of the current cleaning cycle. For example, during the intermediate phase, the cleaning system 300 may be configured not to deliver air or cleaning liquid onto the respective sensor surface 442. In some cases, implementing the intermediate phase during a current cleaning cycle may allow the cleaning liquid to in a sense "soften" dirt residue that may be stuck on the respective cleaning surface 442.

Irrespective of whether the current cleaning cycle includes the intermediate phase, the controller 310 is configured to trigger the air delivery phase. The controller 310 may trigger the air compressor 350 to drive air from the air inlet 304 through the air manifold 340 so as to be delivered by one or more air nozzles 710 and one or more deflection orifices 720. In FIG. 9, there is depicted three representations 912, 914 and 916 of how an air jet 930 and a deflection jet 940 are generated and delivered by the delivery unit 450 (the air nozzle 710 and the deflection orifice 720, respectively) onto the respective sensor surface 442.

As previously alluded to, the angled configuration of the air nozzle 710 in the lower top plate 418 allows the air jet 930 to be oriented towards the center of the respective sensor surface 442. Also, as it can be seen on the three representations 912, 914, and 916, the air jet 930 is shaped by the diffusor 854 into an air jet having an elliptical profile. In some embodiments, it is contemplated that having the air jet 930 delivered with an elliptical profile may allow increasing the effective area of the respective sensor surface 442 that receives the air jet 930.

Developers of the present technology have realized that, after delivery of the liquid jet 920 during the liquid delivery phase of the current cleaning cycle, some liquid residue may remain in the liquid nozzle 730 and/or may accumulate near the diffusor 852, for example, due to surface tension. The developers of the present technology have also realized that when the air jet 930 is being delivered, a low-pressure zone may be created near the diffusor 852 and/or the liquid nozzle 730 and which may force liquid residue to contaminate the air jet 930 and be delivered onto the respective sensor surface 442. Such contamination of the air jet 930 and/or delivery of the liquid residue onto the respective sensor surface 442 may be undesirable as it reduces the cleaning performance of the cleaning system 300.

As such, during the air delivery phase of the current cleaning cycle, the deflection jet 940 is generated simultaneously with the air jet 930. As previously alluded to, the angled configuration of the deflection orifice 720 in the lower top plate 418 allows the deflection jet 940 to be oriented away from the center of the respective sensor surface 442 and/or away from the air nozzle 710 and/or away from the air jet 930. The purpose of the deflection jet 940 is to prevent liquid residue in the liquid nozzle 730 and/or near the diffusor 852 from contamination of the air jet 930 and to be delivered onto the respective sensor surface 442. It can be said that the deflection orifice 720 generates a secondary air jet that is configured to in a sense, "pick up" the undesired liquid residue left on the delivery unit 450 after the liquid delivery phase and evacuate it away from the delivery unit 450 and the respective sensor surface 442.

As it can be seen on the three representations 912, 914, and 916, the deflection jet 940 has a circular profile formed by the deflection orifice 720. However, it is contemplated that a variety of diffusors may be added to the delivery unit 450 for shaping the profile of the deflection jet 940.

In some embodiments of the present technology, it is contemplated that the liquid delivery phase and the air delivery phase may partially overlap each other in time. In other words, the controller 310 may be configured to trigger the air delivery phase prior to terminating the liquid delivery phase. Having overlapping liquid-air delivery phases may be possible due to at least fluidly uncoupled air and liquid manifolds of the cleaning system 300. In some embodiments, the simultaneous delivery of the deflection jet 940 and of the air jet 930 may be possible due to the deflection orifice 720 and the air nozzle 710 being fluidly connected to a common air manifold and/or delivering air from the main chamber and the secondary chamber that are fluidly connected with each other.

In further embodiments of the present technology, a sequence of delivery phases may vary in a given cleaning cycle. In one example, the liquid and air delivery phases may be sequentially staggered in time. In another example, a given sequence of delivery phases may include a liquid delivery phase, an other liquid delivery phase, and an air delivery phase. As such it is contemplated that in some embodiments of the present technology, the controller 310 may trigger more liquid delivery phases than air delivery phases during a given cleaning cycle, and vice versa.

Figure 10:
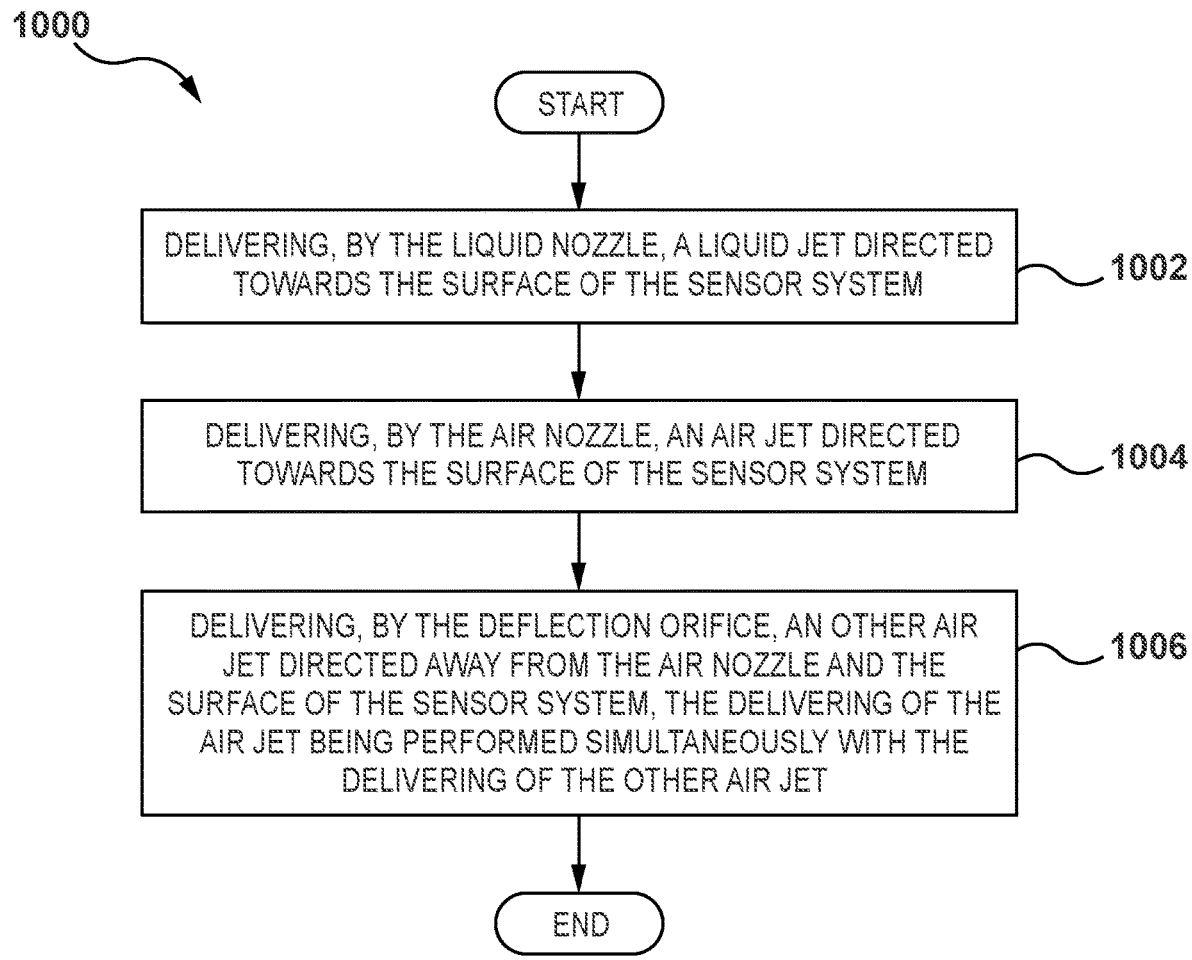
FIG. 10 depicts a flowchart illustrating an example method for cleaning a surface of a sensory system of the SDC.

With reference to FIG. 10, in some embodiments of the present technology, the delivery unit 450 of the cleaning system 300 may be employed for performing a method 1000 of cleaning a surface of a sensor system. Various steps of the method 100 will now be described with greater details.

Step 1002: Delivering, by the Liquid Nozzle, a Liquid Jet Directed Towards the Surface of the Sensor System The method 1002 begins at step 1002 with the liquid nozzle 730 delivering the liquid jet 920 that is directed towards the sensor surface 442 of the sensor system 440. In some cases, liquid residue may accumulate near the liquid nozzle 730 after delivery of the liquid jet 920.

In some embodiments of the present technology, the step 1002 of delivering the liquid jet 920 is performed during a liquid delivery phase of a given cleaning cycle. It should be noted that other phases may be included during a given cleaning cycle.

In at least some embodiments of the present technology, the method 1000 may comprise performing by the delivery unit 450 of the cleaning system 300 a plurality of cleaning cycles including the given cleaning cycle.

Step 1004: Delivering, by the Air Nozzle, an Air Jet Directed Towards the Surface of the Sensor System The method 1000 continues to step 1004 with the air nozzle 710 configured to deliver the air jet 930 that is directed towards the sensor surface 442 of the sensor system 440. The air jet 930 may be used to dry the sensor surface 442 after the delivery of the liquid jet 920.

In some embodiments of the present technology, the step 1004 of delivering the air jet 930 is performed during an air delivery phase of a given cleaning cycle. It should noted that other phases may be included during a given cleaning cycle.

In at least some embodiments of the present technology, the method 1000 may comprise performing by the delivery unit 450 of the cleaning system 300 a plurality of cleaning cycles including the given cleaning cycle.

In further embodiments of the present technology, it is contemplated that the step 1004 may be performed simultaneously with at least one other step of the method 1000. For example, the step 1004 may be performed simultaneously with a step 1006. In another example, the step 1004 may be begin before the step 1002 has ended, or in other words, the air jet 930 may start to be delivered before the liquid jet 920 stopped from being delivered.

Step 1006: Delivering, by the Deflection Orifice, an Other Air Jet Directed Away from the Air Nozzle and the Surface of the Sensor System, the Delivering of the Air Jet being Performed Simultaneously with the Delivering of the Other Air Jet The method continues to the step 1006 with the deflection orifice 720 delivering the other air jet (e.g., the deflection jet 940) that is directed away from the air nozzle 710 and the surface 442. In some cases, the other air jet may be directed away from the air nozzle 710 and/or away from the surface 442 for deflecting liquid residue away from the air jet 930 and/or the surface 442.

In some embodiments of the present technology, the step 1006 of delivering the other air jet may be performed during an air delivery phase of a given cleaning cycle. It should noted that other phases may be included during a given cleaning cycle. In at least some embodiments of the present technology, the method 1000 may comprise performing by the delivery unit 450 of the cleaning system 300 a plurality of cleaning cycles including the given cleaning cycle.

In some embodiments, the air delivery phase of the given cleaning cycle is performed immediately after the liquid delivery phase of the given cleaning cycle. In further embodiments, a time interval of the liquid delivery phase of the given cleaning cycle may at least partially overlap with an other time interval of the air delivery phase of the given cleaning cycle. Also, in some embodiments, the given cleaning cycle may further include an intermediate phase between the liquid delivery phase and the air delivery phase for delaying the air delivery phase after performing the liquid delivery phase. In yet other embodiments, a number of cleaning cycles in the plurality of cleaning cycles may be pre-determined by an operator of the cleaning system 300.

In some embodiments of the method 1000, the method 100 may further comprise a step where the controller 310 monitors an indication of occlusion of the surface 442 and in response to the controller 310 determining that the indicating is below a pre-determined threshold, the method 1000 may further comprises a step where the controller 310 stops operation of the delivery unit 450. In some cases, the controller 310 may stop operation until a new indication of occlusion is above the pre-determined threshold.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

While the above-described implementations have been described and shown with reference to particular steps performed in a particular order, it will be understood that some of these steps may be combined, sub-divided, or re-ordered without departing from the teachings of the present technology. Accordingly, the order and grouping of the steps is not a limitation of the present technology.

The invention claimed is:

1. A delivery unit for a cleaning system, the cleaning system for cleaning a sensor system of a Self-Driving Car (SDC), the sensor system and the cleaning system being mounted onto the SDC,
the delivery unit comprising:
   a liquid nozzle for delivering a liquid jet and directing the liquid jet towards a surface of the sensor system;
   an air nozzle for delivering an air jet and directing the air jet towards the surface of the sensor system; and
   a deflection orifice for delivering an other air jet;
   the liquid nozzle, the air nozzle, and the deflection orifice disposed in a triangular configuration, wherein in the triangular configuration,
      the air nozzle and the liquid nozzle being angled towards each other,
      the deflection orifice being angled towards the liquid nozzle, thereby deflecting liquid residue from the liquid nozzle away from the air nozzle,
   the air nozzle and the deflection orifice being in fluid communication with a single air manifold;
wherein the sensor system has a housing, the housing having:
   a bottom plate for attachment to a surface of the SDC;
   one or more walls connecting the bottom plate to a top plate, the surface of the sensor system being disposed inside the housing and facing outwardly towards the one or more walls; and
   the top plate defining the air conduit, the liquid conduit, and the triangular configuration positioned on an edge of the top plate, the triangular configuration oriented to deliver the air jet and the liquid jet towards the surface of the sensor system placed vertically below the top plate.

2. The delivery unit of claim 1, wherein the liquid nozzle is in fluid communication with a reservoir through a liquid conduit of a liquid manifold, and the air nozzle is in fluid communication with an air inlet through an air conduit of the single air manifold, the air conduit being fluidly uncoupled from the liquid conduit.

3. The delivery unit of claim 2, wherein the air conduit has a distal end and a proximal end,
the proximal end being fluidly coupled to the air inlet,
   the distal end forming (i) a main chamber for providing air to the air nozzle and (ii) a secondary chamber for providing air to the deflection orifice.

4. The delivery unit of claim 1, wherein the surface of the SDC is a surface of at least one of: a roof, a front grill, and a side door of the SDC.

5. A cleaning system for cleaning a sensor system of a Self-Driving Car (SDC), the sensor system and the cleaning system being mounted onto the SDC, the cleaning system comprising:
   a reservoir for storing a cleaning liquid of the cleaning system;
   an air inlet for providing an air source to the cleaning system;
   a liquid manifold providing fluid communication between (i) the reservoir and a delivery unit;
   an air manifold for providing fluid communication between (ii) the air inlet and the delivery unit;
   a compressor unit for driving (i) the liquid from the reservoir to the delivery unit and (ii) the air from the air inlet to the delivery unit; and
   the delivery unit including:
      a liquid nozzle for delivering a liquid jet and directing the liquid jet towards a surface of the sensor system;
      an air nozzle for delivering an air jet and directing the air jet towards the surface of the sensor system; and
      a deflection orifice for delivering an other air jet;
      the liquid nozzle, the air nozzle, and the deflection orifice disposed in a triangular configuration, wherein in the triangular configuration:
         the air nozzle and the liquid nozzle being angled towards each other,
         the deflection orifice being angled towards the liquid nozzle, thereby deflecting liquid residue from the liquid nozzle away from the air nozzle;
      the air nozzle and the deflection orifice being in fluid communication with the air manifold;
   wherein the sensor system has a housing, the housing having:
      a bottom plate for attachment to a surface of the SDC;
      one or more walls connecting the bottom plate to a top plate, the surface of the sensor system being disposed inside the housing and facing outwardly towards the one or more walls; and
      the top plate defining the air conduit, the liquid conduit, and the triangular configuration positioned on an edge of the top plate, the triangular configuration oriented to deliver the air jet and the liquid jet towards the surface of the sensor system placed vertically below the top plate.

6. The cleaning system of claim 5, wherein the compressor unit includes (i) an air compressor for driving air from the air inlet to the delivery unit, and (ii) a liquid compressor for driving the cleaning liquid from the reservoir and the delivery unit.

7. The cleaning system of claim 5, wherein the liquid nozzle is in fluid communication with the reservoir through a liquid conduit of a liquid manifold, and the air nozzle is in fluid communication with an air inlet through an air conduit of the air manifold, the air conduit being fluidly uncoupled from the liquid conduit.

8. The cleaning system of claim 7, wherein the air conduit has a distal end and a proximal end,
the proximal end being fluidly coupled to the air inlet,
the distal end forming (i) a main chamber for providing air to the air nozzle and (ii) a secondary chamber for providing air to the deflection orifice.

9. The cleaning system of claim 7, wherein the sensor system has a housing, the housing having:
a bottom plate attached to a surface of the SDC;
one or more walls connecting the bottom plate to a top plate, the surface of the sensor system being disposed inside the housing and facing outwardly towards the one or more walls; and
the top plate defining the air conduit and the liquid conduit, the delivery unit positioned on an edge of the top plate and oriented to deliver the air jet and the liquid jet towards the surface of the sensor system.

10. The cleaning system of claim 9, wherein the surface of the SDC is a surface of at least one of: a roof, a front grill, and a side door of the SDC.

* * * * *